United States Patent [19]

Lotton et al.

[11] 4,188,969
[45] Feb. 19, 1980

[54] RESERVE FUEL TANK SYSTEM

[75] Inventors: Wilson H. Lotton; Delbert R. Sears, both of Cottonwood, Ariz.

[73] Assignee: Gladys Mayden, Citrus Heights, Calif.

[21] Appl. No.: 865,954

[22] Filed: Dec. 30, 1977

[51] Int. Cl.² .............................................. F23K 5/00
[52] U.S. Cl. ..................................... 137/264; 137/265
[58] Field of Search ................... 280/5; 137/255, 264, 137/266, 262, 256, 265

[56] References Cited

U.S. PATENT DOCUMENTS

| | | | |
|---|---|---|---|
| 1,157,643 | 6/1914 | Kuhn | 137/546 |
| 2,840,147 | 6/1958 | Almested | 137/265 X |

*Primary Examiner*—Alan Cohan
*Attorney, Agent, or Firm*—Cahill, Sutton & Thomas

[57] ABSTRACT

A fuel tank having an upper compartment has a lower compartment separated from the upper compartment by means of a dividing member. The dividing member is sealably attached to the side walls of the fuel tank and has a small opening substantially centrally located therein. A first fuel tube extends through the top of the fuel tank into the upper compartment to a level near the bottom of the upper compartment. A second fuel tube also extends through the top of the fuel tank and through the opening in the dividing member to a level near the bottom of the lower compartment. A solenoid-activated valve is coupled to the first and second fuel tubes externally of the fuel tank. The selector valve is connected by means of a third tube to a fuel pump which pumps fuel from a selected one of upper and lower compartments to an engine. The selector valve is initially switched to select the upper compartments. When the upper compartment is emptied, the selector valve is switched over to the lower compartment, which serves as a reserve tank.

8 Claims, 4 Drawing Figures

RESERVE FUEL TANK SYSTEM

BACKGROUND OF THE INVENTION

1. Field of the Invention:

The invention relates to fuel tanks having reserve compartments therein and systems for delivering fuel from such fuel tanks.

2. Description of the Prior Art:

Reserve fuel tanks are frequently utilized on motor vehicles. Reserve tanks are often desirable because conventional fuel gauges for indicating the amount of remaining fuel in a fuel supply system are frequently inaccurate. Further, the fuel level indication of such fuel gauges becomes quite meaningless if the vehicle is operated on a slope, because fuel collects in one corner of the gas tank, altering the level of fuel in the fuel tank with respect to the bottom of the fuel tank. This alters the level of a float, which floats on the surface of the fuel to control a sending unit which, in turn, activates the fuel gauges.

Auxiliary tanks connected to a selector valve which is connected to the engine fuel pump may provide one solution to the foregoing problem. Typically the selector valve is a solenoid-activated valve which is controlled from the dashboard of the vehicle. When one tank runs out of fuel, the driver flips a switch on the dashboard which switches the selector valve over to an auxiliary tank. At that point, the driver knows exactly how much fuel remains if the auxiliary tank is full at that point.

Auxiliary tanks have several problems. The cost of auxiliary fuel tanks is high. Usually, several fuel tanks need to be filled separately, which may be inconvenient, especially if such fuel tanks are located on opposite sides of a vehicle. Finding space for additional tanks within a particular vehicle is frequently difficult.

Motorcycles and certain small vehicles which use gravity flow fuel systems instead of fuel pumps have incorporated selector valve switches which select one of two different fuel lines which extend to different levels within such fuel tanks. This creates, in effect, a reserve supply of fuel between the levels of the higher extending and lower extending fuel lines. However, such fuel tanks provide no protection against the problem of fuel building up in a corner of the fuel tank when the vehicle is operated on a slope, so that the level of fuel in the tank falls below the level of the fuel line.

The state of the art with respect to vehicular fuel tanks is generally shown by the following U.S. Pat. Nos.: 3,949,720; 3,884,255; 3,802,596; 3,964,755; 3,968,896; 3,784,050; 4,000,727; and 3,912,107.

SUMMARY OF THE INVENTION

Accordingly, it is an object of the invention to provide a fuel system which reliably and accurately indicates when a specific amount of fuel remains in a fuel tank.

It is another object of the invention to provide a low cost vehicular fuel system with a reserve fuel supply.

It is another object of the invention to provide a reserve fuel system utilizing only one fuel tank.

It is another object of the invention to provide a fuel tank and system which reliably delivers fuel to a fuel line when a vehicle in which the fuel tank is installed is operated on various inclines.

Briefly described, and in accordance with one embodiment thereof, the invention provides a fuel system including a fuel tank having an upper compartment and a lower compartment separated from the upper compartment by a dividing member which has an opening approximately centrally located therein. The opening permits fuel introduced into the upper compartments to flow into and fill the lower compartment. The lower compartment is sealed with respect to the upper compartment, except for the opening. The capacity of the lower compartment may be approximately ten percent of the total capacity of the fuel tank. A first fuel line for withdrawing fuel from the fuel tank extends into the lower compartment to a point close to the bottom thereof. When a vehicle in which the fuel tank is installed operates on a slope such that, absent the dividing member, the fuel would collect in a corner of the fuel tank, the dividing member prevents fuel in the lower compartment from collecting in a corner of the fuel tank. Thus, the intake end of the first fuel line remains immersed in fuel when the vehicle is operated on a steep incline even when the fuel tank is only approximately ten percent full of fuel.

In one embodiment of the invention, a second fuel line extends into the upper compartment to a point relatively close to the bottom of the first compartment. Both the first and second fuel lines are connected to a fuel pump by means of a selector switch which operates to couple the first or the second fuel tube to the fuel pump so that the full pump draws fuel from the lower or the upper compartment, respectively. Thus, the lower compartment serves as a reserve fuel tank. Preferably, the selector valve is a solenoid-activated selector valve which may be operated from the dashboard of the vehicle.

DESCRIPTION OF THE INVENTION

Figure 1:
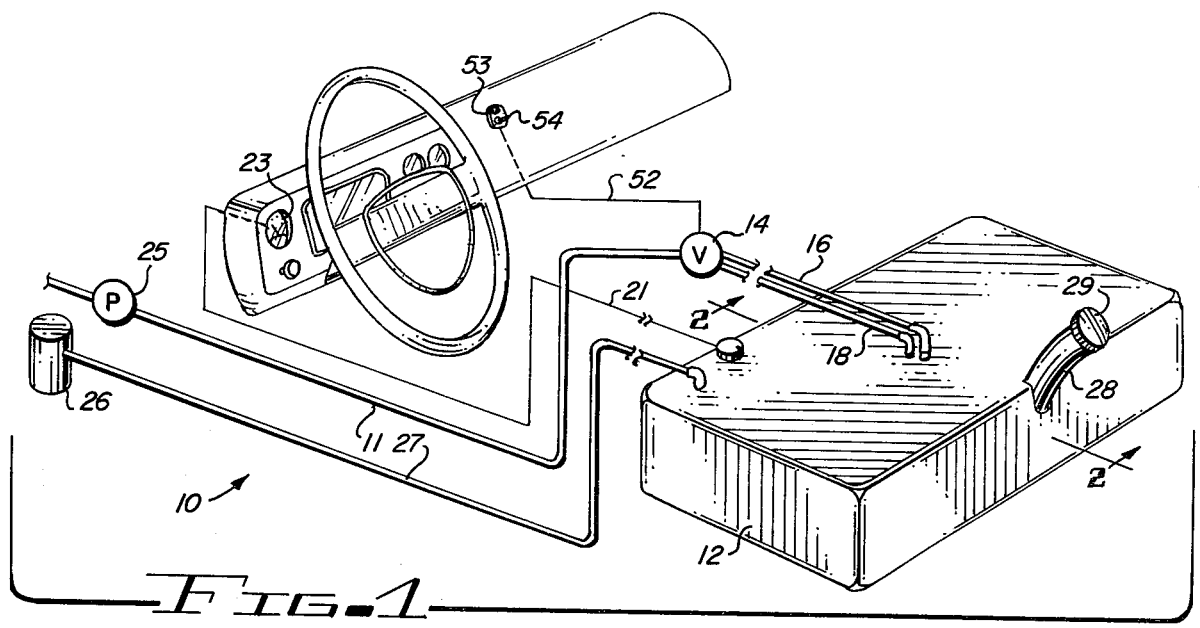
FIG. 1 is a perspective diagram illustrating the fuel tank system of the invention.

Referring to the drawings, and particularly to FIG. 1, the fuel delivery system 10 includes a fuel tank 12 having two fuel suction tubes 16 and 18 (hereinafter referred to as fuel lines 16 and 18) extending through the top of fuel tank 12. Fuel lines 16 and 18 are connected to inlets of a solenoid-activated selector valve 14. Solenoid-activated selector valve 14 has an outlet connected to fuel line 11, which is connected to an inlet of fuel pump 25. The outlet of fuel pump 25 is connected to the carburetion system of an automobile or other vehicle.

Solenoid-activated selector valve 14 is switched to select one or the other of fuel lines 16 and 18 into series communication with fuel line 11. Line 52 represents an electrical conductor from solenoid-activated selector valve 14 to electrical switch 54, which is mounted on the dashboard of the automobile. An indicator light 53 indicates which position the switch is in, and therefore indicates whether the solenoid-activated selector valve is switched to deliver fuel from the main compartment or a reserve compartment of fuel tank 12 to fuel pump 25. (The manner in which fuel tank 12 operates as a reserve fuel tank will be explained subsequently).

Figure 2:
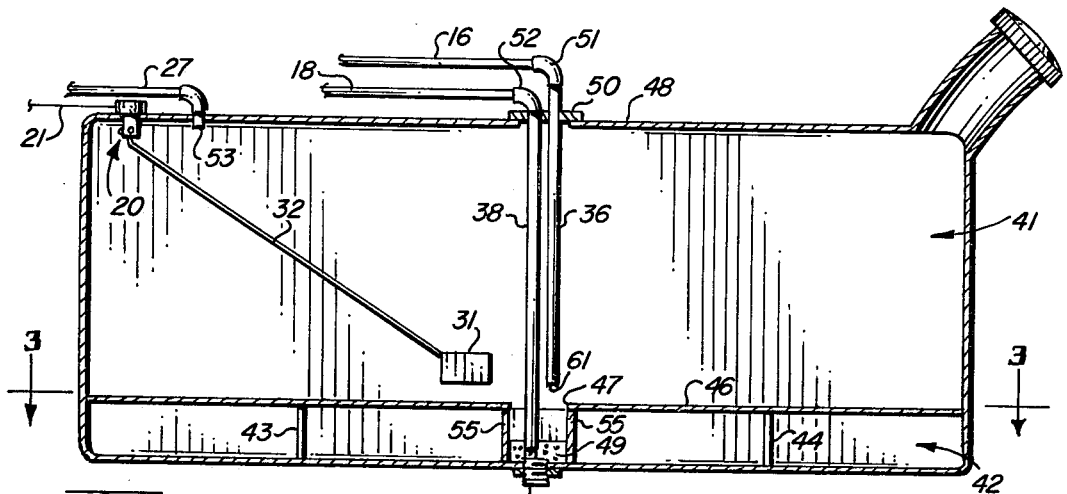
FIG. 2 is a sectional view taken along section lines 2—2 of the fuel tank of FIG. 1.
Figure 3:
FIG. 3 is a view taken along section lines 3—3 of FIG. 2 illustrating a bracket which supports the longer interior fuel line of FIG. 3.
Figure 4:
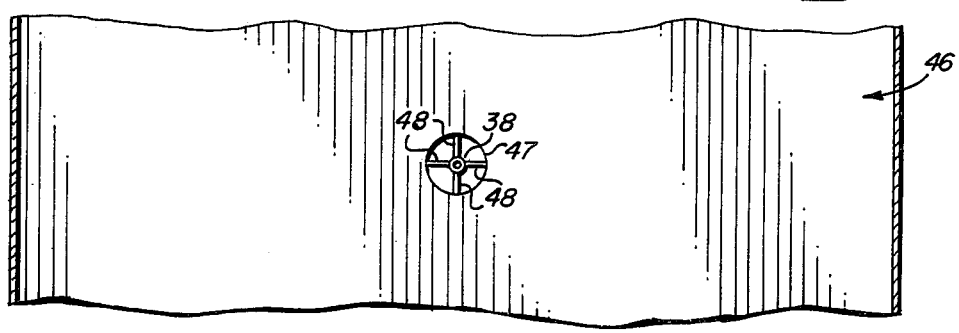
FIG. 4 shows an alternate configuration for the lower compartment of the fuel tank of FIGS. 1 and 2.

FIG. 2 shows a view along section lines 202 of FIG. 1. It is seen that fuel tank 12 is divided into an upper compartment 41 and a lower compartment 42 by means of a dividing member 46. A top view of dividing member 46 is shown in FIG. 3. Dividing member 46 has an opening 47, which is approximately centrally located therein. Dividing member 46 is attached to the side walls of fuel tank 12 such that the upper and lower compartments 41 and 42 are sealed from each other except for opening 47.

Fuel line 18 is connected by means of elbow member 52 to fuel line 38, which extends from support member 50 to a point near the bottom of lower compartment 42. Fuel line 38 is supported at its upper end by support member 50 and at its lower end by bracket members 48 shown in FIG. 3. Bracket members 48 are attached to cylindrical baffle member 55, which has a diameter approximately equal to the diameter of opening 47. Cylindrical baffle member 55 supports dividing member 46 about opening 47. Cylindrical baffle member 55 includes one or more relatively small openings indicated by reference numeral 49, which openings are sufficiently large to permit fuel introduced into upper compartment 41 to flow into and fill up lower compartment 42 at a suitably rapid rate. However, openings 49 are sufficiently small that if fuel tank 12 is suddenly tipped at, say, a 20 degree angle, when the upper compartment is empty or nearly empty but the lower compartment 42 is relatively full, fuel will only gradually flow through small openings 49 and opening 47 and into a corner of upper compartment 41. Thus, the lower intake end of fuel line 38 remains immersed in fuel and fuel continues to be pumped to the fuel pump, even though if it were not for the presence of dividing member 46 and baffle member 55, the fuel in fuel tank 12 would all collect in a corner thereof leaving the intake end of fuel line 55 above the level of the gas collected in the corner so that the vehicle would be "out of gas".

Baffle members 43 and 44 provide additional support for dividing member 46. Baffle members 43 and 44 may form a single cylindrical member concentric with baffle member 55, or they may be individual baffle members. The main function of baffle members 44 is to provide support for dividing member 46, but they may advantageously serve to impede the lateral motion of fuel if fuel tank 12 is suddenly tipped, thereby improving the supply of fuel at the intake end of fuel tube 38 when fuel tank 12 is nearly out of fuel.

Fuel tank 12 includes a sender unit 20 connected by means of electrical conductor 21 to gas gauge 23, which is mounted on the dashboard of the vehicle to indicate the amount of fuel remaining in fuel tank 12. Sender unit 20 is activated by means of a float 31 connected by arm member 32 to sender unit 20. Float 31 floats on the surface of the fuel, thereby indicating the amount of fuel remaining in fuel tank 12. However, when fuel tank 12 is tipped, the reading is inaccurate because the level of fuel relative to sender unit 20 is altered. Further, fuel level gauges are notoriously nonlinear and inaccurate, as previously mentioned.

Pollution control of fumes emitted from fuel tank 12 due to changes in temperature is achieved by means of vent tube 27 which is attached to the top of fuel tank 12 at vent opening 53 thereof to transport fuel fumes through activated charcoal canister 26, thereby reducing atmospheric pollution by fuel fumes from fuel tank 12.

An additional fuel tube 36 is supported by support member 50 from the upper boundary member 48 of fuel tank 12. Fuel line 36 extends to a point near the bottom of upper compartment 41. Thus, when solenoid-activated selector valve 14 is switched to select fuel lines 16 and 36, the upper or main compartment 41 is "selected". Fuel is drawn by fuel pump 25 through fuel line 11, solenoid-activated selector valve 14, and fuel lines 16 and 36 from upper compartment 41. When the level of fuel in upper compartment 41 falls below intake end 61 of fuel line 36, no more fuel will be pumped until dashboard switch 54 is flipped to cause solenoid-activated selector valve 14 to select fuel line 18, which then draws fuel from lower or reserve compartment 42 through fuel tube 38 and 18. Thus, lower compartment 42 effectively serves as a "reserve tank".

Often, it will be advantageous to place dividing member 46 such that the volume of lower compartment 42 is approximately equal to ten percent of the total volume of fuel tank 12.

The above described fuel tank system overcomes the difficulties associated with fuel tank systems including multiple separate fuel tanks by reducing the cost of the additional tanks and by eliminating the problems associated with finding suitable places on a vehicle to mount several separate fuel tanks. The inconvenience of having to fill two separate tanks, especially if they are mounted on opposite sides of the vehicle, is also avoided. The problems associated with inaccurate fuel level gauges and the problems associated with operating vehicles on inclines when there is only a small amount of fuel left in the fuel tank are also avoided by the fuel tank system of the invention.

Although the invention has been described with reference to a particular embodiment thereof, those skilled in the art will recognize that variations in arrangement of the parts may be made within the scope of the present invention. For example, valve 14 may be manually activated rather than solenoid-activated. And, of course, the invention is applicable to boats, and airplanes as well as automotive vehicles.

We claim:

1. A fuel tank for providing fuel reliably when said fuel tank is relatively empty and when a vehicle wherein said fuel tank is installed operates on inclines, said fuel tank comprising, in combination:
   (a) an upper compartment;
   (b) a lower compartment;
   (c) a dividing member bounding said upper compartment and said lower compartment and separating said upper and lower compartment, said dividing member having therein an approximately centrally located opening for permitting fuel introduced into said upper compartment to fill said lower compartment, said dividing member being attached to the inner walls of said fuel tank so that said lower compartment is sealed from said upper compartment except for said approximately centrally located opening, wherein said approximately centrally located opening is sufficiently large to accommodate a first fuel tube and to permit filling of said lower compartment at a predetermined rate; and
   (d) said first fuel tube extending through said approximately centrally located opening into said lower compartment to a point sufficiently distant from the bottom of said fuel tank to avoid any residue or debris at the bottom of said fuel tank from being sucked into said fuel tube when fuel is removed from said fuel tank through said fuel tube.

2. The fuel tank of claim 1 wherein said fuel tank is substantially rectangular and is relatively shallow, such that its depth is substantially less than its length or width.

3. The fuel tank of claim 1 further including baffle means disposed in said lower compartment for supporting said dividing member and for damping the flow of fuel through said baffle means.

4. The fuel tank of claim 3 wherein said baffle means includes a substantially cylindrical baffle member supporting said dividing member approximately concentrically with respect to said centrally located opening.

5. The fuel tank of claim 4 wherein said substantially cylindrical baffle member has at least one relatively small opening therein to permit fuel to flow to the intake end of said first fuel tube, whereby the intake end of said fuel tube remains immersed in fuel when said fuel tank is tipped and the level of fuel in said fuel tank is so low that said upper compartment is empty or nearly empty.

6. A reserve fuel delivery system for delivering fuel to an engine, said reserve delivery system comprising, in combination:
(a) a fuel tank having an upper compartment and a lower compartment;
(b) a dividing member separating the upper and lower compartment, said dividing member being sealably attached to the walls of said fuel tank and having an opening approximately centrally located in said dividing member through which fuel may flow from the upper compartment into the lower compartment;
(c) a first fuel tube extending through the top of said fuel tank and into the interior of said fuel tank to a first predetermined distance from said dividing member;
(d) a second fuel tube extending through the top of said fuel tank and through said upper compartment into said lower compartment through said opening to a second predetermined distance from the bottom of said lower compartment;
(e) a fuel pump connected to the engine for pumping fuel from said fuel tank to the engine;
(f) valve means coupled to said fuel pump and to said first and second fuel tubes for selectively coupling one of said first and second fuel tubes to said fuel pump to allow said fuel pump to pump fuel from the selected one of said first and second fuel tubes; and
(g) selective means operatively connected to said valve means for effecting said selecting of one of said first and second fuel tubes.

7. The reserve fuel delivery system of claim 6 wherein said selective means is a solenoid-activated selection valve and further including a control conductor coupled from the control electrode of said solenoid-activated selector valve to the dashboard of a vehicle wherein said reserve fuel delivery system is installed, and further including a switch on said dashboard connected to said control conductor for selectively applying a control voltage to said control conductor to effect said selecting of one of said first and second fuel tubes.

8. The reserve fuel delivery system of claim 6 further including an approximately cylindrical baffle member approximately concentric with said opening and having a small opening therein to limit the rate of flow of fuel between said upper compartment and said lower compartment.

* * * * *